United States Patent
Sasa et al.

Patent Number: 5,292,156
Date of Patent: Mar. 8, 1994

[54] CORRUGATED PIPE COUPLING

[75] Inventors: Takeya Sasa; Yoshikazu Kobayashi, both of Tokyo, Japan

[73] Assignee: Nitto Kohki Co., Ltd., Tokyo, Japan

[21] Appl. No.: 943,570

[22] Filed: Sep. 11, 1992

[51] Int. Cl.⁵ .................... B65D 59/00; F16L 19/02
[52] U.S. Cl. .................................. 285/23; 285/318; 285/322; 285/356; 285/903
[58] Field of Search ............... 285/322, 323, 318, 23, 285/356, 353, 903

[56] References Cited

U.S. PATENT DOCUMENTS

| | | | |
|---|---|---|---|
| 1,371,981 | 3/1921 | Rose | 285/353 X |
| 2,112,238 | 3/1938 | Guarnaschelli | 285/353 X |
| 2,503,169 | 4/1950 | Phillips | 285/903 |
| 4,063,757 | 12/1977 | Führmann | 285/903 X |
| 4,437,691 | 3/1984 | Laney | 285/353 |
| 4,606,564 | 8/1986 | Kurachi | |
| 4,674,775 | 6/1987 | Tajima et al. | 285/330 |
| 4,904,002 | 2/1990 | Sasa et al. | 285/318 |
| 4,995,832 | 2/1991 | Thommen et al. | 285/903 |
| 5,080,405 | 1/1992 | Sasa et al. | |
| 5,131,696 | 7/1992 | Sykes et al. | 285/903 X |

FOREIGN PATENT DOCUMENTS

| | | | |
|---|---|---|---|
| 2402892 | 8/1974 | Fed. Rep. of Germany | 285/903 |
| 60628 | 3/1939 | Norway | 285/353 |

*Primary Examiner*—Randolph A. Reese
*Assistant Examiner*—Heather Chun
*Attorney, Agent, or Firm*—Wenderoth, Lind & Ponack

[57] ABSTRACT

A pipe coupling for the union of a corrugated pipe therewith is formed of a pipe coupling proper and a lock cylinder for fixing a corrugated pipe. The lock cylinder is helically joined to the inner surface of the leading part of the pipe coupling proper and fixes the corrugated pipe by rotationally closing the lock cylinder helically tacked to the pipe coupling proper, and at the same time seals the pipe coupling proper by pressing the leading terminal part of the lock cylinder against a seal ring attached fast to the interior of the pipe coupling proper, enabling the corrugated pipe to be infallibly locked and sealed owing to the provision of a spacer adapted to preset and keep a closing distance for the lock cylinder. The spacer is detachably attached to the periphery of the pipe coupling proper.

8 Claims, 2 Drawing Sheets

CORRUGATED PIPE COUPLING

BACKGROUND OF THE INVENTION

1. Field of the Invention

This invention relates to a pipe coupling for the union of corrugated pipes.

2. Description of the invention

Heretofore, as a means for the union of corrugated pipes, a pipe coupling which comprises a pipe coupling proper and a lock cylinder adapted to be helically joined to the inner surface of the leading part of the pipe coupling proper and provided with lock means capable of attaching fast thereto a corrugated pipe inserted therein and which, therefore, enables the corrugated pipe to be fixed and, at the same time, pushed in the same direction until the leading terminal part thereof is pressed against a seal ring inside the pipe coupling proper to seal the pipe coupling proper by closing the lock cylinder helically tacked to the pipe coupling proper has been known in the art.

Another pipe coupling has been known in the art which comprises a pipe coupling proper provided on a leading terminal side thereof with a large-diameter through hole. In a recessed part thereof is a small-diameter through hole. In a connecting stepped part joins the large-diameter through hole and the small-diameter through hole with a circumferential groove and a stopper part for securing the leading part of a corrugated pipe. The circumferential groove has a seal ring for insertion therein and a lock cylinder provided with an annular groove part adapted for helical union with the inner surface of the large-diameter through hole of the pipe coupling proper and possessed of a through hole roughly equal in diameter to the outside diameter of a corrugated pipe and a tapered surface on the rear terminal side inner wall of the through hole and a circumferentially expansible rigid ring inserted in the circumferential groove part. This therefore enables the rigid ring to be depressed by the circumferential groove part of the lock cylinder into fast engagement with the outside-diameter groove of the corrugated pipe inserted in the pipe coupling and consequently causes the corrugated pipe to be pushed in the same direction until the leading terminal part thereof is brought into engagement with the stopper part of the pipe coupling proper and pressed in a plastically deformed state into contact with the seal ring by rotationally closing the lock cylinder helically tacked to the pipe coupling proper.

SUMMARY OF THE INVENTION

These conventional pipe couplings have no particular means for displaying the amount of a backward motion to be produced by the lock cylinder during the union of corrugated pipes and, therefore, tend to entail a problem of dislocation of the lock cylinder due to vibrations exerted thereon during packing work or transportation. Though the work of union of corrugated pipes is carried out by a skilled operator using his experience the possibility still exists that, through the operator's failure to exercise due care, the lock cylinder will not be closed over a sufficient distance and the seal will be produced in an incomplete state. Further, since the rigid ring inserted in the circumferential groove part formed in the inner wall of the through hole of the lock cylinder has room to play in the radial direction inside the circumferential groove part, there arises the possibility that, during the insertion of a corrugated pipe into the pipe coupling, the leading terminal of the corrugated pipe will fail to enter the central part of the rigid ring. The possibility also exists that the load for the insertion of a corrugated pipe will be unusually heavy and will render the work of union of corrugated pipes difficult and the rigid ring will sustain an injury and consequently render the fixation of corrugated pipes imperfect and the seal of the leading terminal part imperfect.

This invention aims to enable the lock cylinder to acquire a proper closing distance and the seal to retain safety of performance by presetting the closing diameter for the lock cylinder and, at the same time, join corrugated pipes by causing the rigid ring to be nipped between the tapered surface continuing into the circumferential groove part and the leading terminal face of a supporter inserted slidably in the lock cylinder and complete union of the corrugated pipes by bringing the rigid ring into engagement with the outside-diameter groove of the corrugated pipe.

To implement this object, the present invention is directed to a pipe coupling for the union of a corrugated pipe therewith, a pipe coupling proper and a lock cylinder for fixing a corrugated pipe are helically joined. The lock cylinder is threaded to the inner surface of the leading part of the pipe coupling proper and fixes the corrugated pipe by rotationally closing the lock cylinder helically tacked to the pipe coupling proper. At the same time, the pipe coupling proper is sealed by pressing the leading terminal part of the lock cylinder against a seal ring attached fast to the interior of the pipe coupling proper. The pipe coupling has a spacer adapted to allow setting and keeping a closing distance for the lock cylinder that is detachably attached to the periphery of the pipe coupling proper.

Further, this invention is directed to a pipe coupling for the union of a corrugated pipe therewith formed of a pipe coupling proper provided on the leading terminal side thereof with a large-diameter through hole. In a recessed part thereof is a small-diameter through hole. A connecting stepped part is interposed between the large-diameter through hole and the small-diameter through hole, along with a circumferential groove and a stopper part for securing the leading terminal part of a corrugated pipe. A seal ring is inserted in the circumferential groove. A lock cylinder is provided with a circumferential groove part adapted for helical union with the inner surface of the large-diameter through hole of the pipe coupling proper, and is possessed of a through hole roughly equal in diameter to the outside diameter of a corrugated pipe and a tapered surface on the rear terminal side inner wall of the through hole. A circumferentially expansible rigid ring is inserted in the circumferential groove part. The pipe coupling gives to the rear terminal side through hole opening in the rear terminal of the lock cylinder and continuing into the circumferential groove part a diameter larger than the diameter of the leading terminal side through hole of the circumferential groove part. And uses a cylindrical supporter containing a through hole of a diameter larger than the outside diameter of a corrugated pipe that is fitted slidably with prescribed pressure on the rear terminal side through hole over a distance extending from the rear terminal side through hole to the interior of the circumferential groove. The supporter adapts the rigid ring inserted inside the circumferential groove part to be nipped between a tapered surface formed to continue into the circumferential groove part and the leading terminal face of the supporter.

BRIEF DESCRIPTION OF THE DRAWINGS

This invention will be better understood and other objects and features thereof will become apparent when consideration is given to the following detailed description thereof, which makes reference to the annexed drawings, in which.

DETAILED DESCRIPTION OF PREFERRED EMBODIMENTS

Figure 1:
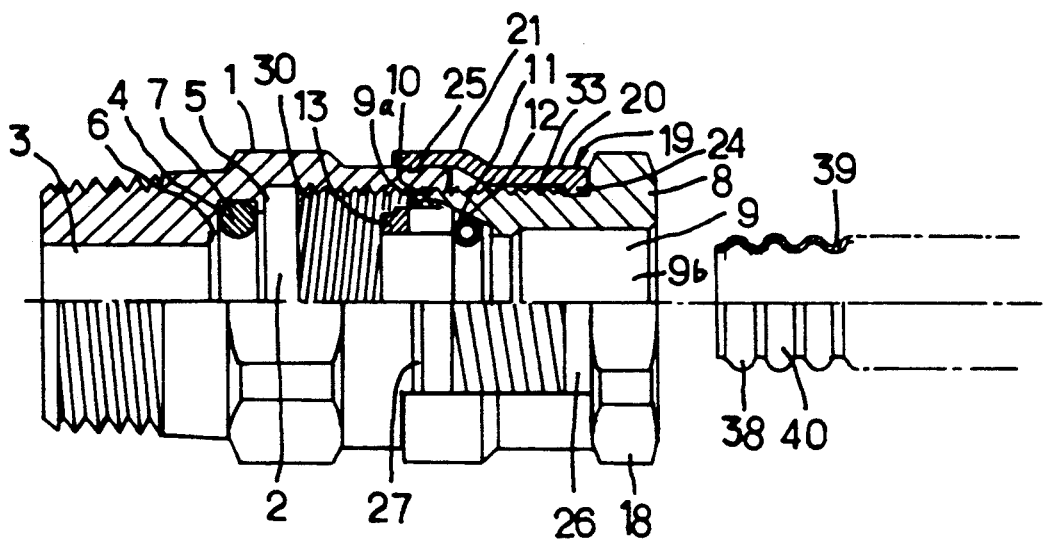
FIG. 1 is a partially longitudinally sectioned side view illustrating a pipe coupling proper and a corrugated pipe as a separated state according to one embodiment of this invention.

Since the spacer attached fast to the periphery of the pipe coupling proper sets and keeps a fixed closing distance for the lock cylinder helically tacked to the pipe coupling proper, the leading terminal part of the corrugated pipe is depressed over a fixed distance onto the seal ring inside the pipe coupling proper during the union of corrugated pipes and the corrugated pipes are consequently joined in an infallibly sealed state. Moreover, since the rigid ring inserted in the circumferential groove part formed in the inner wall of the through hole of the lock cylinder is nipped between the tapered surface formed to continue into the circumferential groove part and the leading terminal face of the supporter, this rigid ring is guided by the tapered surface concentrically with the through hole of the lock cylinder and retained in the concentric state by the pressure of the supporter. When the corrugated pipe is inserted into the through hole of the lock cylinder held in the ensuant state, the leading terminal part of the corrugated pipe enters the central part of the rigid ring and the outside-diameter ridges of the corrugated pipe force their way through the rigid ring while expanding the rigid ring in the centrifugal direction. When the rigid ring coincides with any of the outside-diameter ridges, the expanded rigid ring contracts in the concentric direction and comes into engagement with that outside-diameter ridge and prevents the corrugated pipe from accidental extraction.

Now, this invention will be described more specifically below with reference to embodiments illustrated in the drawings.

As illustrated in FIG. 1, the interior of a pipe coupling proper or pipe coupling body 1 is provided on the leading terminal side thereof with a large-diameter through hole 2 and on the recessed part side thereof with a small-diameter through hole 3 connected to the large-diameter through hole 2. A circumferential groove 4 and a stopper part 6 adjoin the circumferential groove 4 and served the purpose of securing the leading terminal part of a corrugated pipe 40 which will be specifically described herein below and are formed continuously to a connecting stepped part 5 which is interposed between the large-diameter through hole 2 and the small-diameter through hole 3. A seal ring 7 for sealing the periphery of the corrugated pipe 40 is inserted in the circumferential groove 4 and prevented from falling toward the large-diameter through hole 2 side by the connecting stepped part 5. A female thread 30 is formed on the inner surface of the large-diameter through hole 2.

With reference again to FIG. 1, a lock cylinder 8 has a male thread 33 formed on the periphery thereof and therefore fits helically to the large-diameter through hole 2 of the pipe coupling proper 1. A through hole 9 conforming to the outside diameter of the corrugated pipe 40 is provided inside the lock cylinder 8. A circumferential groove part 10 is formed in the rear terminal side inner wall of the through hole 9. A tapered surface 12 is provided on the leading terminal side inner wall of the circumferential groove part 10. A rigid ring 11 is contained in the circumferential groove part 10. A rear terminal side through hole 9a opening in the rear terminal of the lock cylinder 8 and communicating with the circumferential groove part 10 is formed with a diameter larger than the diameter of a leading terminal side through hole 9b of the circumferential groove part 10.

Figure 2:
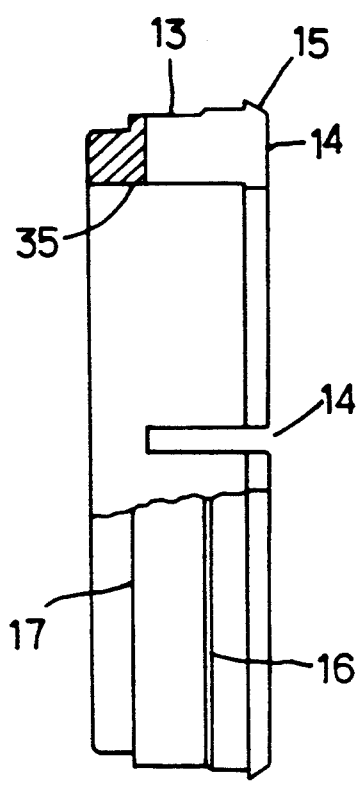
FIG. 2 is a magnified partially longitudinally sectioned side view illustrating a supporter.

With reference to FIG. 1 and FIG. 2, a supporter 13 is inserted slidably in the lock cylinder 8 over a distance extending from the rear terminal side through hole 9a to the circumferential groove part 10 and is adapted to use the leading terminal part thereof for pressing the rigid ring 11 inside the circumferential groove part 10 against the tapered surface 12. This supporter 13 consists of a cylindrical body containing a through hole 35 of a diameter larger than the outside diameter of the corrugated pipe 40. The supporter 13 has a plurality of slits 14 formed in the front side wall thereof as cut in the radial direction and spaced circumferentially so as to acquire concentric resilience. Thus, it is pressed against the inner wall surface of the rear terminal side through hole 9a with force enough to avoid easy extraction from the rear terminal side through hole 9a of the lock cylinder 8. A projected part 15 is formed on the periphery of the leading terminal of the support 13 and is adapted to engage with the rear terminal side inner wall of the circumferential groove part 10 and prevent the support 13 from being extracted. A first stepped part 16 is formed on the periphery of the front side part of the support 13 and adapted to engage with the rear terminal side inner wall of the circumferential groove part 10 when the rigid ring 11 is pressed against the tapered surface 12 by the leading terminal of the supporter 13. A second stepped part 17 is formed on the rear terminal side periphery of the supporter 13 so that when the supporter 13 is moved in consequence of the closure of the lock cylinder 8, the second stepped part 17 engages with the connecting stepped part 5 of the pipe coupling proper 1, obstructs the supporter 13 from being moved backwardly any further, restricts the room for closure of the seal ring 7 by the rear terminal part of the supporter 13 and, at the same time, forces the rigid ring 11 into engagement with the outside-diameter grooves 39 of the corrugated pipe 40. A projected part 18 is formed in a hexagonal shape on the periphery of the leading terminal part of the lock cylinder for the purpose of facilitating the helical engagement of the lock cylinder 8 with the pipe coupling proper 1.

Figure 3:
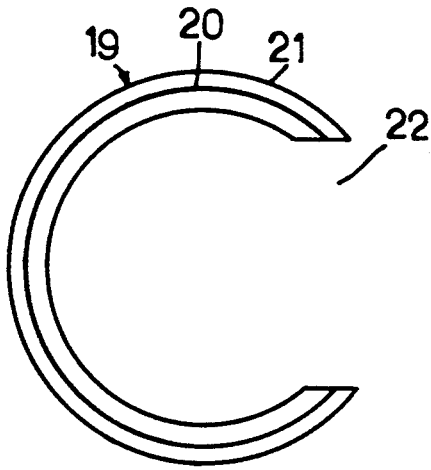
FIG. 3 is a magnified front view of a spacer.
Figure 4:
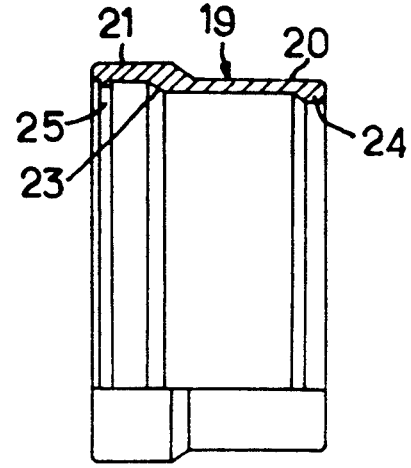
FIG. 4 is a partially cutaway side view of the spacer.

In FIG. 3 and FIG. 4, a spacer 19 made of resin is intended to set a closing distance for the lock cylinder 8 which is joined helically to the pipe coupling proper 1. This spacer 19 is composed of a small-diameter fitting part 20 to be fitted fast on the periphery of the lock cylinder 8 and a large-diameter fitting part 21 to be fitted fast on the periphery of the leading terminal part of the pipe coupling proper 1. It has a tapered part 23 formed on the inner surface thereof in the connecting part intervening between the small-diameter fitting part 20 and the large-diameter fitting part 21. This spacer 19 has a cutaway groove 22 formed in the lateral side thereof in the longitudinal direction so as to assume a cross section of the shape of the letter C. On the inner wall surface of the leading terminal part of the small-diameter fitting part 20 and on the inner wall surface of the rear terminal part of the large-diameter fitting part 21 of the spacer, a first small ridge 24 and a second small ridge 25 are respectively formed each in the circumferential direction.

In FIG. 1, the female thread 30 formed on the leading terminal inner surface of the pipe coupling proper 1 and the male thread 33 formed on the periphery of the lock cylinder 8 are meshed with each other. The spacer 19 is fitted on the periphery of the leading terminal of the pipe coupling proper 1 and the periphery of the lock cylinder 8. The first small ridge 24 formed on the inner wall surface of the terminal part of the small-diameter fitting part 20 of the spacer is meshed with a first engaging groove 26 of the lock cylinder 8. The positional relation in the axial direction of the lock cylinder 8 to the pipe coupling proper 1 is such that when the second small ridge 25 formed on the inner surface of the large-diameter fitting part 21 is meshed with a second engaging groove 27 of the pipe coupling proper 1, the closing distance of the lock cylinder 8 is both necessary and sufficient for ensuring safe sealing of the corrugated pipe 5.

Now, the operation for joining the pipe coupling for a corrugated pipe with the corrugated pipe will be described below.

Figure 5:
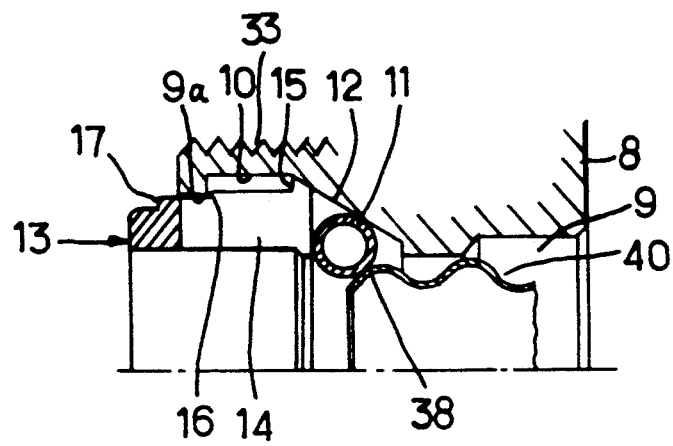
FIG. 5 is a cross section of an essential part of a pipe coupling, with a corrugated pipe inserted in a through hole of a lock cylinder.
Figure 6:
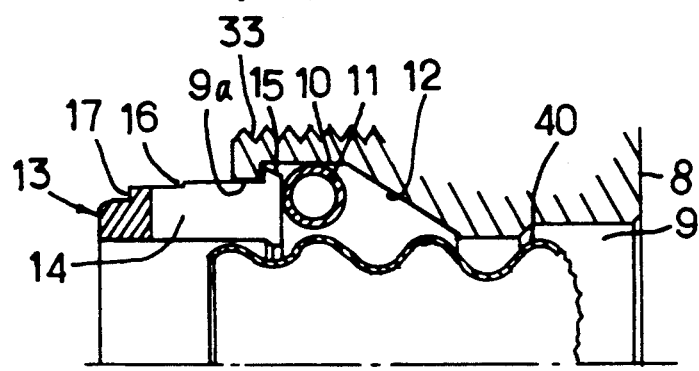
FIG. 6 is a cross section of the essential part of the pipe coupling, with the corrugated pipe inserted and the supporter pushed backwardly inside a radially expanded rigid ring.
Figure 7:
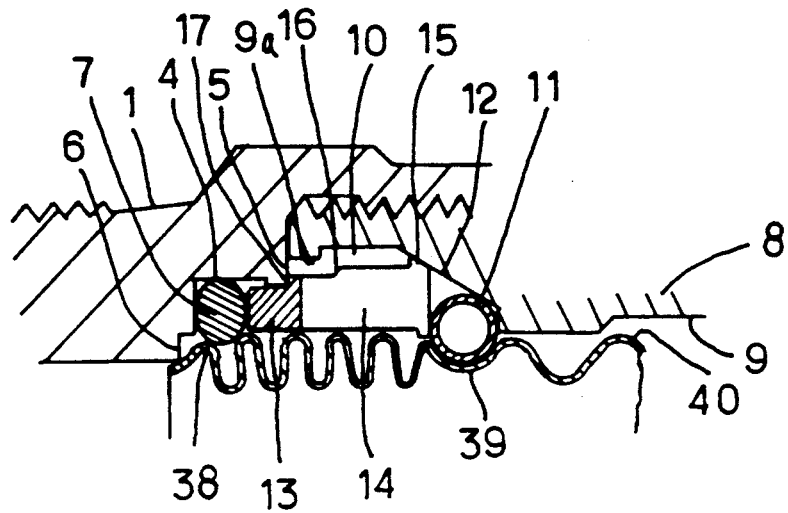
FIG. 7 is a cross section of the essential part of the pipe coupling, with the rigid ring nipped between the leading terminal face of the supporter advanced forwardly by the rotational backward motion of the lock cylinder and a tapered surface and the corrugated pipe consequently joined.

When the corrugated pipe 40 is inserted into the through hole 9 of the pipe coupling proper 1 from the lock cylinder 8 side, the leading terminal of the inserted corrugated pipe 40 enters the central part of the rigid ring 11 without fail because the rigid ring 11 is retained concentrically with the through hole 9 by the cooperation of the leading terminal face of the supporter 13 and the tapered surface 12 (FIG. 5). Owing to the pressure exerted by the outside-diameter ridges 38 on the leading terminal part of the corrugated pipe 40, the rigid ring 11 is moved backwardly into the circumferential groove part 10 and expanded in the centrifugal direction and the supporter 13 is also moved backwardly (FIG. 6). Since the expansion of the rigid ring 11 allows insertion therein of the corrugated pipe 40, the corrugated pipe 40 is inserted as it is.

When the lock cylinder 8 is rotationally closed after the leading terminal part of the corrugated pipe 40 has engaged with the stopper part 6, the spacer 19 is moved backwardly as caught on the projected part 18 in consequence of the closure of the lock cylinder 8. The spacer 19 having the large-diameter fitting part 21 thereof fitted fast to the leading terminal periphery of the pipe coupling proper 1 is released from the pipe coupling proper 1 when the small-diameter fitting part 20 connected to the tapered part 23 continuing into the large-diameter fitting part 21 rides over the periphery of the leading terminal part of the pipe coupling proper 1 and, as a result, the cutaway groove 22 is widened. At the time that the spacer 19 falls off, the lock cylinder 8 presses the leading terminal of the corrugated pipe 40 over the prescribed distance against the stopper part 6 and the corrugated pipe 40 presses the leading terminal part thereof in a plastically deformed state against the seal ring 7 to create and retain a safe sealed state.

When the lock cylinder 8 which is provided with the male thread 33 fit for helical union with the female thread 30 of the pipe coupling proper 1 is closed by rotation, the second stepped part 17 of the supporter 13 fitted in the rear part side through hole 9a of the lock cylinder 8 comes into engagement with the connecting stepped part 5 and stops. When the lock cylinder 8 is moved backwardly by further rotation, the leading terminal of the supporter 13 thrusts into the circumferential groove part 10 and causes the leading terminal part thereof to press the resilient ring 11 against the tapered surface 12. The rigid ring 11 thus pressed by the supporter 13 is guided by the tapered surface 12 concentrically with the through hole 9 of the lock cylinder 8 and is eventually nipped between the leading terminal face of the supporter 13 and the tapered surface 12 connected to the circumferential groove part 10 and retained in a sealed state concentrically with the through hole 9. In this case, the supporter 13 can be radically contracted in the centrifugal direction owing to the plurality of slits 14 cut in the axial direction in the front side wall of the cylinder.

By the fact that the rigid ring 11 held in contact with the tapered surface 12 comes into engagement with the outside-diameter grooves 39 of the corrugated pipe 40 and consequently contracts in the concentric direction, the corrugated pipe 40 is fixed in place and the lock cylinder 8 rotates and moves the corrugated pipe 40 in the closing direction, i.e. the direction of the recessed part, until the leading terminal part thereof is pressed against the stopper part 6. The leading terminal part of the corrugated pipe 40 thus pressed against the stopper part 6 is plastically deformed and consequently allowed to be pressed intimately against the seal ring and prevented from continuing the closure thereof any further. The corrugated pipe 40 thus pushed forward in the same direction in consequence of the closure of the lock cylinder 8 causes the leading terminal part thereof to be pressed tightly in a plastically deformed state against the seal ring 7 to preclude leakage of liquid.

The sealing of the corrugated pipe 40 with the pipe coupling under discussion is accomplished by the tight pressure which the leading terminal of the corrugated pipe 40 produces against the seal ring 7 by virtue of the plastic deformation. Since this plastic deformation is effected by the closure of the lock cylinder 8 on the pipe coupling proper 1, the closing distance of the lock cylinder 8 which is required for the leading terminal part of the corrugated pipe 40 to produce plastic deformation sufficient for ensuring perfect sealing is generated by the spacer 13. If this closing distance is not sufficient, the plastic deformation which is sufficient for ensuring perfect sealing can not be obtained.

In accordance with this invention, in the union of a corrugated pipe with the pipe coupling of this invention, the leading terminal part of the corrugated pipe can be pressed with a proper amount of motion against the seal ring part in the pipe coupling proper and the corrugated pipe can be joined in a safely sealed state to the pipe coupling because the closing distance of the lock cylinder helically tacked to the pipe coupling proper is set by the pipe coupling and the spacer fitted fast to the periphery of the lock cylinder. Further, since the rigid ring inserted in the circumferential groove part formed in the through hole and the inner wall of the lock cylinder is nipped between the tapered surface continuing into the circumferential groove part and the leading terminal face of the supporter, the rigid ring is guided by the tapered surface concentrically with the through hole of the lock cylinder and the leading terminal of the corrugated pipe inserted in the lock cylinder as retained concentrically therewith by the pressure of the supporter enters the central part of the rigid ring without fail. Thus, the corrugated pipe can be locked and sealed safely. This invention accordingly has an effect of facilitating the work of union of the corrugated pipe with the pipe coupling.

While there have been shown and described preferred embodiments of the invention, it is to be distinctly understood that the invention is not limited thereto but may be otherwise variously embodied and practiced within the scope of the following claims.

What is claimed is:

1. A pipe coupling for a corrugated pipe, comprising:
   a pipe body coupling body having a leading end, a rear end, an interior having an inner surface, and a seal ring fixed to said interior of said pipe coupling body;
   a lock cylinder for fixing a corrugated pipe in said pipe coupling body, said lock cylinder being rotatably joined to said inner surface of said pipe coupling body, said lock cylinder having a leading end portion adapted to seal against said seal ring of said pipe coupling body upon rotation of said lock cylinder relative to said pipe coupling body for fixing the corrugated pipe and advance of said lock cylinder into said pipe coupling body; and
   a spacer that is detachably attached to the outer periphery of both said pipe coupling body and said lock cylinder spacing said leading end portion of said lock cylinder from said seal ring of said pipe coupling body a predetermined closing distance, said spacer being adapted to detach from said lock cylinder and said pipe coupling body upon advance of said lock cylinder into said pipe coupling body.

2. The pipe coupling of claim 1, wherein:
   respective grooves are provided in said pipe coupling body and said lock cylinder; and
   said spacer has respective ridges thereon engaging the respective said grooves.

3. The pipe coupling of claim 2, wherein said spacer further has a tapered surface for engagement with said pipe coupling body upon advance of said lock cylinder into said pipe coupling body for detachment of said spacer by disengaging said ridges from said grooves.

4. The pipe coupling of claim 3, wherein said spacer is a partial ring extending about said pipe coupling body and said lock cylinder which has a gap therein enabling said partial ring to be expanded upon said tapered surface engaging said pipe coupling body.

5. A pipe coupling for a corrugated pipe, comprising:
   a pipe coupling body having a leading end, a rear end, a large diameter through hole therein at said leading end, a small diameter through hole at said rear end, a connecting portion interposed between said large diameter through hole and said small diameter through hole comprising a circumferential groove and a stopper part for stopping the leading end of a corrugated pipe, and a seal ring in said circumferential groove; and
   a lock cylinder having a portion adapted to be rotatably connected with the inner surface of said large diameter through hole of said pipe coupling body, a through hole extending therethrough for receiving a corrugated pipe therein, a circumferential groove portion in said through hole having a tapered surface at a rear end of said lock cylinder on the inner wall of said through hole and a circumferentially expansible rigid ring in said circumferential groove portion, wherein the rear end of said through hole of said lock cylinder has a larger internal diameter than the internal diameter of the front end of said lock cylinder, and a cylindrical supporter having a hole therethrough for receiving a corrugated pipe, a leading end face and a plurality of slits about the circumference thereof, said cylindrical supporter being slidably disposed in said circumferential groove portion for engaging said rigid ring with said leading end face so that said rigid ring is held between said tapered surface and said cylindrical supporter, wherein said cylindrical supporter further includes a larger diameter projected part on a front end of the periphery thereof engaging the inside of the rear end of said through hole, a first stepped part on the middle of the periphery thereof engaging said cylindrical supporter with the inner walls of said through hole of said lock cylinder at the rear end thereof and a second stepped part on the rear of the periphery thereof for engaging said pipe coupling body in said through hole thereof.

6. The pipe coupling of claim 5, wherein said slits of said cylindrical supporter extend to said leading end face thereof such that said larger diameter projected part is resilient.

7. The pipe coupling of claim 5, wherein said larger diameter projected part engages said tapered surface of said circumferential groove portion.

8. The pipe coupling of claim 5, wherein said larger diameter projected part has a larger diameter than the diameter of said inner wall of said through hole of said lock cylinder at the rear end thereof for preventing said cylindrical supporter from being retracted from said lock cylinder.

* * * * *